United States Patent

[11] 3,617,231

[72] Inventors James E. Fenstermacher
  Du Bois;
  John R. Le Blanc, Brockway, both of Pa.
[21] Appl. No. 735,580
[22] Filed June 10, 1968
[45] Patented Nov. 2, 1971
[73] Assignee Brockway Glass Company, Inc.
  Brockway, Pa.

[54] METHOD OF CONTROLLING THE SOFTENING POINT AND WORKING TEMPERATURE OF SODA-LIME GLASS BY REGULATING THE WATER CONTENT OF THE GLASS MELT
8 Claims, No Drawings

[52] U.S. Cl. .................................................. 65/134,
  106/52
[51] Int. Cl. .................................................. C03b 5/04,
  C03c 3/04
[50] Field of Search ........................................... 65/134;
  106/52

[56] References Cited
UNITED STATES PATENTS
2,331,052 10/1943 Shadduck ..................... 65/134
3,001,881 9/1961 Slayter ........................ 106/52
3,081,180 3/1963 Krinov .......................... 106/52

OTHER REFERENCES
Kingery, Introduction to Ceramics, 1960, John Wiley & Sons, Inc., pages 572–578

Primary Examiner—S. Leon Bashore
Assistant Examiner—Saul R. Friedman
Attorney—Christel & Bean ABSTRACT: In the continuous melting of batch ingredients to form soda-lime glass, the water content of the molten glass is regulated to control the softening point of the resultant glass and consequently the optimum working temperature. Usually this consists in increasing the water content of the molten glass in an amount sufficient to increase the water content of the resultant glass by at least approximately fifty percent to lower the softening point although, particularly in holding the water content to a predetermined weight percent, the method may involve reducing the water content. The water may be added to molten glass by bubbling steam through the melt, by maintaining the partial pressure of water over the molten glass at a predetermined level, or by varying the batch ingredients so that ingredients having increased available water are present in the batch.

METHOD OF CONTROLLING THE SOFTENING POINT AND WORKING TEMPERATURE OF SODA-LIME GLASS BY REGULATING THE WATER CONTENT OF THE GLASS MELT

This invention relates to a novel method of regulating and controlling the softening point of glass by controlling the water content thereof during the melting and fining thereof.

The softening point of glass is a characteristic of considerable importance in the manufacture of glass for various reasons. For instance, in manufacturing glass containers the working temperature of the glass in the forming machines is directly related to the softening point of the glass. Glass having a lowered softening point will have a consequently lowered working range and its fabrication into glass articles is simplified and improved.

A common method of reducing the softening point of a glass melt is to increase the soda ash content of the batch. However, reducing the softening point in this manner is subject to two important objections. First, the soda ash is the most costly ingredient of ordinary glass batches and, secondly, an increase in the soda ash content of the glass reduces its chemical durability, that is, it renders the glass more subject to chemical corrosion.

SUMMARY OF THE INVENTION

Ordinary soda-lime glasses of such formulations as are normally employed in the manufacture of containers contain approximately 0.02 percent by weight of water. We have found that increasing this water from 0.02 weight percent to 0.03 weight percent has the effect of lowering the softening point of the resultant glass by 6° C. and this would of course likewise reduce the optimum working temperature of the glass by a like amount. This lowering of the working temperature of glass effects a substantial improvement in fabricating the glass, for instance in conventional bottle or other glass container fabricating machines employed in the press and blow method of manufacture.

While the above increase of water content and the consequent lowering of the softening point and working temperature of a glass is a primary objective of the present invention, the control of these characteristics of glass by controlling the water content may be availed of for other purposes, such as controlling or establishing the softening point of glass at a predetermined point, irrespective of whether such control involves either increasing or decreasing the water content of the glass to either lower or raise the softening point to the desired level.

More specifically, and in addition to the general proposal of lowering the softening point by the addition of water to the glass melt, the principles of the present invention may be employed to simultaneously lower the softening point and also control it to a predetermined level or degree. For instance, glass from a given furnace might, due to several variables including batch variations, heat gradient variations and others, vary a few degrees in softening point and working temperature from day to day or hour to hour.

Among factors which affect the amount of water in glass are the temperature of the melt, the ratio of exposed surface to total volume, the degree of agitation, the chemical composition of the melt, and the duration of exposure of the glass, that is, the rate of flow through a given melting tank. Other factors also influence the amount of water included in glass.

According to the present invention the addition of water to the glass melt may be regulated to reduce the softening point of the resultant glass by a varying amount calculated to reduce such softening point to a predetermined constant temperature. That is, when the glass would otherwise have a higher softening point than average, more water would be added to the glass melt to lower its softening point to the predetermined norm, whereas when the softening point is running lower than normal the addition of water to the molten glass would be reduced to likewise hold the resultant glass to the predetermined desired softening point temperature.

Speaking generally, three methods of introducing water into the glass during and immediately following melting thereof consist of (1) bubbling steam through the molten glass, (2) adjusting the water vapor pressure of the atmosphere over the glass, and (3) varying the batch materials to cause the resulting glass melt to have a higher water content by using hydroxide constituents for this purpose.

Apart from the improvement attained by lowering the softening point and consequent optimum working temperature of the glass, a very significant improvement in the manufacture of glass containers and other glass articles is attained by regulating the water content of the glass, whether upward or downward in degree, to achieve a constant softening point and consequent constant physical properties, particularly as to viscosity, despite factors which ordinarily cause glass from a continuous tank furnace, for instance, to vary as to softening point.

DESCRIPTION OF THE PREFERRED EMBODIMENTS

In applying the principles of the present invention to a forehearth of a continuous glass melting tank furnace of the type generally employed in container manufacture, the following constants may be assumed. If the glass in the forehearth is one-half foot deep and the forehearth is 2 feet wide and 16 feet long, and glass is pulled therefrom at the rate of 36 tons per day, the transit time of glass through this forehearth would be 47 minutes and thus the velocity of the glass in the forehearth would be 0.34 feet per minute.

We have found that at 2,400° F. the water content of the glass can be raised from 0.02 to 0.03 weight percent in 7 minutes by saturation of the glass with water by bubbling steam into the glass in sufficient quantity. Thus at the velocity of glass assumed above the "saturation" section of the forehearth will have a length of 2.38 feet.

Factors which control the amount of water added to the glass, in addition to the rate of flow of glass through the forehearth, are the rate of liberation of steam into the glass melt and the temperature of the melt. In order to establish control data and determine the quantity of water added to the molten glass as steam to attain certain variations in softening point of the resultant glass, the following laboratory procedures were performed.

400 gram quantities of molten glass were employed and water was introduced at the rate of 0.56 cubic feet of steam per hour. This procedure was performed at various temperatures and determinations were made at various time periods to determine the water content of the glass in terms of weight percent, the molten glass being of such composition that without water addition the weight percent water content would be 0.02. The following table shows the water content of the glass at the specified rate of liberation of steam thereinto and at various temperatures and time periods of exposure to the steam.

TABLE I

| | Time (hours) | | | | | |
|---|---|---|---|---|---|---|
| | ¼ | ½ | 1 | 2 | 3 | 4 |
| Temperature (° F.): | | | | | | |
| 2,500 | 0.044 | 0.057 | 0.065 | 0.067 | 0.067 | 0.069 |
| 2,400 | 0.039 | 0.050 | 0.063 | 0.069 | | 0.069 |
| 2,300 | 0.037 | 0.045 | 0.063 | 0.070 | | |
| 2,200 | | | | 0.061 | | |
| 2,100 | | | | 0.051 | | |

It will be noted that more water is included in the molten glass at higher temperatures, other factors being constant, and, as might be expected, the water content varies directly as the time of exposure to the steam. For example, using the data tabulated in table I, the time periods required to raise the water content of the glass from 0.02 to 0.03 weight percent were calculated and are set forth in table II, the quantity of glass in each case being 400 grams and the rate of liberation of water thereinto being as in the previous case 0.56 cubic feet of steam per hour.

TABLE II

| Temperature (°F.) | 2,500 | 2,400 | 2,300 | 2,200 | 2,100 |
|---|---|---|---|---|---|
| Time (min.) | 5+ | 7 | 10 | 16 | 24 |

Applying the data of tables I and II to the forehearth specified above with a pull of 36 tons of glass per day and a glass temperature of 2,400° F. the amount of water liberated in the glass as steam is calculated to be 3.6 cu. ft. of steam per minute. In arriving at this figure it was noted that the 2.38 foot length of the "saturation" section of the forehearth will contain 2.38 cu. ft. of glass at 145 lbs. per cu. ft. or 345 lbs. of glass. Relating this to the laboratory data set forth in tables I and II the following calculation specifies the required rate of addition of steam to the glass flowing through the forehearth.

$$\frac{345 \text{ lb.} \times 0.56 \text{ cu. ft./hr.}}{400 \text{ gms.}} \times \frac{454 \text{ gm.}}{\text{lb.}} \times \frac{\text{hr.}}{60 \text{ min.}}$$

$$= 3.6 \text{ cu. ft. steam/min.}$$

A second practical method of adding water to a glass melt or, if desired, reducing the water content, is by control of the partial pressure of water over the melt. Conventional glass melting tanks, such as are used in producing soda-lime glass for glass containers, produce glass having a water content of 0.018 to 0.020 percent and the partial pressure is approximately 0.20 atmospheres of water. By increasing the water content of the atmosphere above the glass to a partial pressure of approximately 0.67 atmospheres of water, the water content of the glass produced may be raised to 0.035 percent. This increase was noted in a melting tank where the through time of the glass was approximately 1 hour.

There are many factors which affect the amount of water which will be incorporated in the glass but the above observation presupposes equal conditions. Some of these factors are the temperature of the melt, the ratio of exposed surface to total volume, the degree of agitation, the chemical composition of the melt, and the time of exposure. The time factor is very important since diffusion is dependent upon time. Agitation techniques such as stirring can be used to shorten the time required to produce a given water content with a given partial pressure of water over the melt.

In evaluating the foregoing procedure involving raising the water in the glass from 0.020 weight percent to 0.035 weight percent it is noted that this increase reduced the softening points of like glass compositions from 712.7° C. to 703.0° C. This is equivalent to increasing the soda ash content of the batch by 100 lb. per ton of sand in the batch. The objections to reducing the softening point by increasing the soda ash content were mentioned earlier herein.

Table III shows the effects produced as to water content in the glass by weight percent of two glass melts of like constituency exposed to widely different partial pressures of water over the glass for various time periods. It will be noted that with a relatively low partial pressure of water of 0.01 atmospheres over the glass the water content of the resultant glass is very much reduced.

TABLE III

| Temp. 2,350° F., $P_{H_2O}$ 1 atm. | | Temp. 2,410° F., $P_{H_2O}$ 0.01 atm. | |
|---|---|---|---|
| Time (hr.) | Wt. percent H₂O | Time (hr.) | Wt. percent H₂O |
| 0 | 0.020 | 0 | 0.020 |
| 24 | 0.037 | 22 | 0.017 |
| 43 | 0.058 | 46 | 0.013 |
| 73 | 0.064 | 54 | 0.009 |
| 94 | [1] 0.066 | 118 | 0.007 |
|  |  | 220 | [2] 0.005 |

[1] Close to equilibrium.
[2] Equilibirum.

A third method of increasing the water content of a given glass melt is by the selection and proportioning of ingredients having available water therein either as combined water or by the use of a mineral having water attached. In the following example of a three-component glass, the alumina component of the glass was varied by varying the proportions of aluminum oxide and aluminum hydroxide.

A single three-component glass (55 mole percent $SiO_2$, 29 mole percent $Na_2O$, 16 mole percent $Al_2O_3$) was melted as four different batches. Aluminum oxide ($Al_2O_3$) was added as (1) all $Al_2O_3$; (2) 2 parts $Al_2O_3$, 1 part $Al(OH)_3$; (3) 1 part $Al_2O_3$, 2 parts $Al(OH)_3$; (4) all $Al(OH)_3$. Table IV shows clearly that the higher the hydroxide content of the batch, the higher the water content of the resultant glass.

TABLE IV

Water Content as a Function of Batch Hydroxide Content

| Parts Al(OH)₃ | Wt. % H₂O |
|---|---|
| 0 | 0.013 |
| 1 | 0.023 |
| 2 | 0.029 |
| 3 | 0.035 |

Corresponding tests using varying proportions of calcium carbonate and calcium hydroxide show similar increases in water content of the resultant glass when calcium carbonate and calcium hydroxide are used in the varying proportions noted above in connection with aluminum oxide and aluminum hydroxide.

While specific embodiments of the method of the present invention are set forth herein by way of example, it is to be understood that the scope of the invention is not limited thereto or otherwise than as defined in the appended claims.

We claim:
1. A method of lowering the softening point and working temperature of soda-lime glass in the manufacture thereof by increasing the water content of the molten glass which comprises melting glass batch constituents in a continuous tank furnace wherein raw batch materials are introduced at one end thereof and molten glass is withdrawn from the other end thereof for fabrication into glass articles, and adding water to the melt in an amount sufficient to increase the water content of the resultant glass by at least approximately 50 percent.

2. The method according to claim 1 wherein the water content of the resultant glass is increased from a normal content of approximately 0.02 weight percent to approximately 0.03 weight percent or greater.

3. The method according to claim 1 wherein said water is added to the molten glass by liberating steam therein.

4. The method according to claim 1 wherein said water is added by bubbling steam into the molten glass at the rate of approximately 7 cubic feet of steam per minute for each 100 lbs. of glass flowing through the bubbling section per minute.

5. The method according to claim 1 wherein said water is added by maintaining a partial pressure of the order of 1 atmosphere of water over the molten glass.

6. The method according to claim 1 wherein said water is introduced by including in the batch material a hydroxide compound in an amount sufficient to yield water to the molten glass to increase the water content by at least approximately 0.01 weight percent.

7. A method of maintaining the softening point and working temperature of soda-lime glass at a predetermined level in the manufacture thereof which comprises melting glass batch constituents in a continuous tank furnace wherein raw batch materials are introduced at one end thereof and molten glass if withdrawn from the other end thereof for fabrication into glass articles, and continuously regulating the water content of the melt in said furnace so that the resultant glass has a substantially constant softening point.

8. The method according to claim 7 wherein the water content is regulated by varying the water vapor partial pressure over the molten glass.

* * * * *